(12) United States Patent
Liu et al.

(10) Patent No.: US 7,821,712 B2
(45) Date of Patent: Oct. 26, 2010

(54) THIN FILM TUNABLE OPTICAL FILTER

(75) Inventors: Wen Liu, Wuhan (CN); Kan Yu, Wuhan (CN); Jin Chang, Wuhan (CN); Shuihua Liu, Wuhan (CN); Weilin Guan, Wuhan (CN); Dexiu Huang, Wuhan (CN); Wei Shi, Wuhan (CN); Wei Li, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 672 days.

(21) Appl. No.: 11/819,530

(22) Filed: Jun. 28, 2007

(65) Prior Publication Data
US 2008/0043311 A1   Feb. 21, 2008

(30) Foreign Application Priority Data
Jun. 29, 2006   (CN)   .................. 2006 1 0019486
Dec. 18, 2006   (CN)   .................. 2006 1 0125495

(51) Int. Cl.
*G02B 27/10* (2006.01)
(52) U.S. Cl. .................. 359/495; 359/589; 359/850
(58) Field of Classification Search ......... 359/301–303, 359/350–352, 359, 494, 495, 497, 498, 589, 359/850, 855–857, 884; 385/24, 31, 49; 398/65, 152, 184, 205, FOR. 113
See application file for complete search history.

(56) References Cited

U.S. PATENT DOCUMENTS

| | | | |
|---|---|---|---|
| 4,111,524 A | 9/1978 | Tomlinson, III | |
| 4,474,424 A | 10/1984 | Wagner | |
| 6,084,050 A * | 7/2000 | Ooba et al. | 528/42 |
| 6,122,095 A * | 9/2000 | Fatehi | 359/337 |
| 6,208,444 B1 * | 3/2001 | Wong et al. | 398/9 |
| 6,285,500 B1 * | 9/2001 | Ranalli et al. | 359/497 |
| 6,362,904 B1 * | 3/2002 | Cormack | 398/82 |
| 6,421,177 B1 * | 7/2002 | Leyva et al. | 359/495 |
| 6,714,743 B2 | 3/2004 | Hsieh et al. | |
| 6,943,938 B1 | 9/2005 | Liu et al. | |
| 7,031,060 B2 * | 4/2006 | Mao et al. | 359/494 |

* cited by examiner

Primary Examiner—Frank G Font

(57) ABSTRACT

The tunable optical filter is provided, comprising an optical means for separating an input optical signal into a tunable drop optical signal and an output optical signal, wherein the output optical signal is directed back along the same path as the input optical signal. One embodiment of the invention comprises an optical circulator, a pair of polarization beam splitters, a pair of half-wave plates, an optical thin-film filter, a rotatable mirror, a spatially fixed mirror. Optical wavelengths are selected by making angular adjustments to the optical thin-film filter and the rotatable mirror, which are rotated by the same angle. A corresponding method for spectrally splitting and spatially separating an input optical signal into an output optical signal and a drop optical signal is also provided.

20 Claims, 12 Drawing Sheets

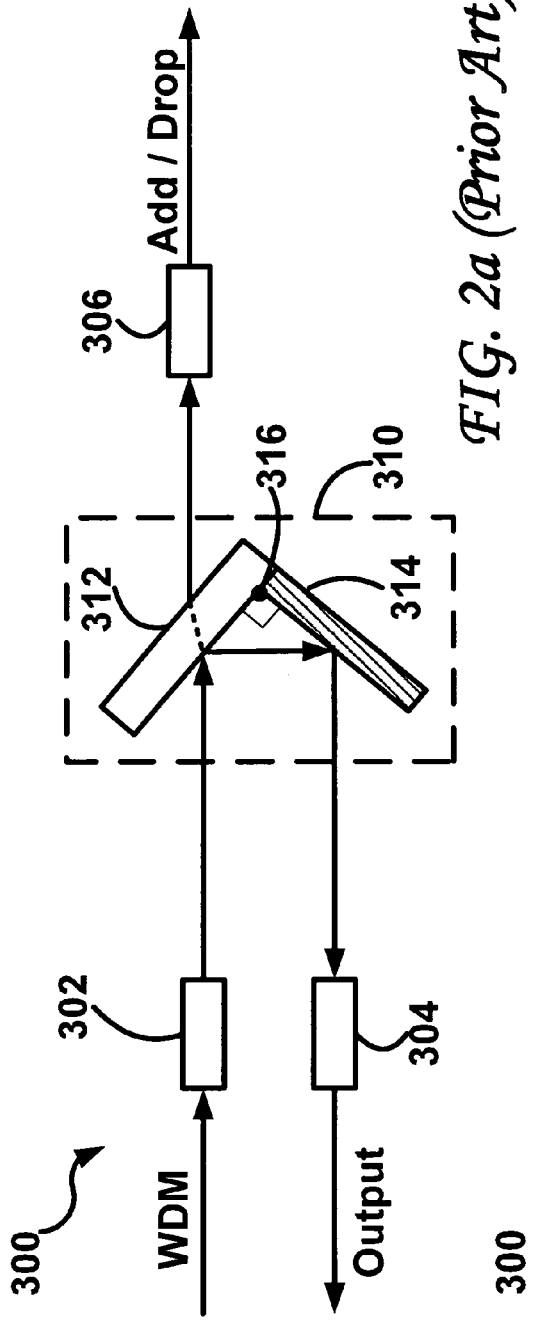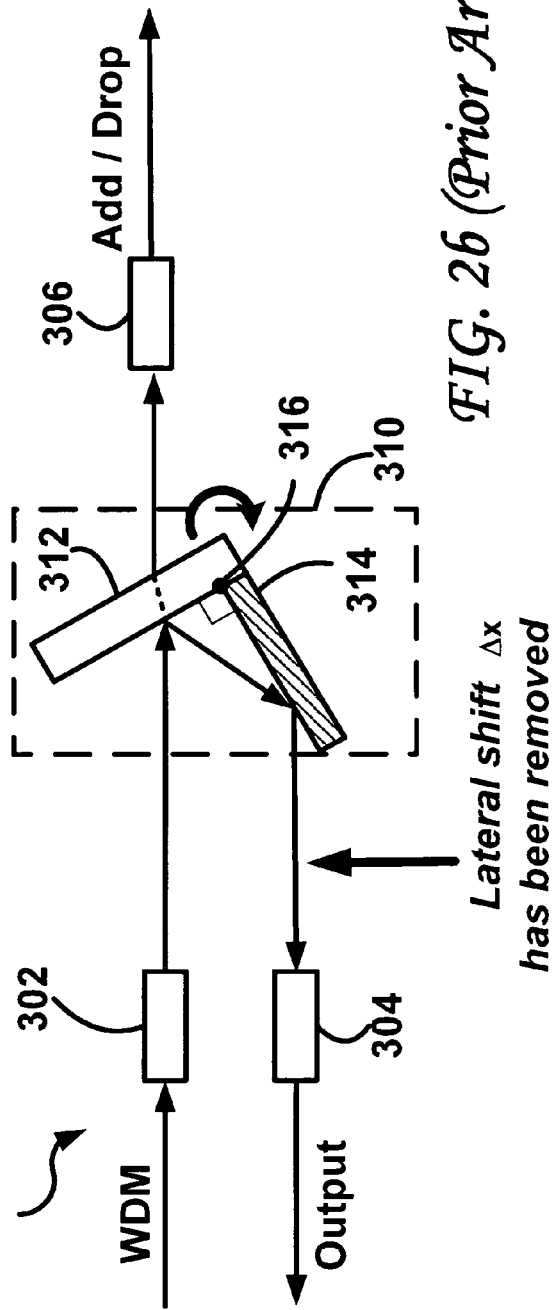

THIN FILM TUNABLE OPTICAL FILTER

In both the U.S. Pat. No. 4,111,524 and U.S. Pat. No. 4,474,424, as illustrated in prior art FIG. 1 of the present application, a three-port optical filter module 10 has been disclosed, comprising the apparatus for separating the plurality of wavelengths 14 and gradient-index (GRIN) lenses 12 to focus the optical signals, thereby ensuring quality of transmission. The limitation of these patents is that the signal passband is centered at a pre-determined wavelength and therefore cannot be dynamically reconfigured.

Tunable optical filters, used in place of the optical multiplexers and demultiplexers of FIG. 1, have been introduced in the industry to provide operational flexibility for optical networks, which allow a dynamic and possibly remote selection of optical wavelengths at source and destination nodes.

There exists a number of known implementations of tunable optical filters. Commonly known implementations include fiber Bragg gratings (FBGs), Fabry-Perot (FP) interferometers, and acousto-optic tunable filters (AOTFs). These tunable optical filters employ tuning mechanisms ranging from thermal (FBGs), mechanical (FBGs and FP interferometers), to acousto-optic effects (AOTF). However, these tunable optical filters suffer common drawbacks such as poor inter-channel isolation, sharp transmission passband, limited tunable wavelength range, and high manufacturing costs.

U.S. Pat. No. 6,943,938 to Liu et al. issued Sep. 13, 2005 and entitled "Tunable wavelength filter with invariant transmission and reflection beam angles" discloses a three-port tunable optical filter 300 of Alliance Fiber Optics Products, Inc. illustrated in prior art FIGS. 2a and 2b of the present application. An L-shaped filter module 310 is comprised of an optical TFF 312 and a mirror 314. An optical signal carrying a complete set of a plurality of wavelengths from an input WDM port 302 is first incident on the optical TFF 312 of the filter module 310, where an arbitrary specified wavelength or band of wavelengths is separated from the complete set of the plurality of wavelengths of the incident optical signal, and is transmitted through the optical TFF 312 to an add/drop port output coupler 306. An optical signal carrying the plurality of the remaining wavelengths is reflected off the optical TFF 312 and the mirror 314 of the optical filter module 310 to an express port output coupler 304. The center wavelength of the arbitrary specified wavelength or band of wavelengths is determined by the angle of incidence of the incident optical signal onto the optical TFF 312 of the filter module 310. This angle of incidence is controlled by a stepper motor that rotates the filter module about its central axis 316.

A major drawback of this optical filter is a small allowable range of rotation of the filter module 310, which limits the tunable wavelength range of the filter.

U.S. Pat. No. 6,714,743 of Optoplex Corporation to Hsieh et al. issued Mar. 30, 2004 and entitled "Wide range tunable filter" discloses a three-port tunable optical filter 400 illustrated in prior art FIGS. 3 and 4 of the present application, which respectively show a side view and a top view of the filter 400. In this optical filter, an input optical signal with random polarization 420 carrying a complete set of a plurality of wavelengths is first converted to a single state of polarization. This is achieved with a polarization beam splitter (PBS) 402, separating the optical signal with random polarization into two polarization components, one with s-polarization 424 and the other with p-polarization 423. The p-polarized component 423 is subsequently rotated into a s-polarized component 422 by using a half-wave plate 404. The two s-polarized components 422 & 424 are then input to the optical filter module 409, which comprises an optical TFF 410 and a mirror 406 attached to a clear optical block 408. The above said two s-polarized components 422 & 424 first travel through the clear optical block 408 to the optical TFF 410. At the optical TFF 410, the complete set of the plurality of wavelengths is separated into an optical signal carrying an arbitrary specified wavelength or band of wavelengths, and another optical signal carrying the plurality of remaining wavelengths. The optical signal carrying the arbitrary specified wavelength or band of wavelengths is transmitted through the optical TFF 410 towards an add/drop output port, while the plurality of remaining wavelengths is reflected off the optical TFF 410, through the clear optical block 408, reflected off the mirror through the clear optical block 408 towards an express output port. Before the optical signals carrying the arbitrary specified wavelength or band of wavelengths and the plurality of remaining wavelengths reaches their respective output ports, the s-polarized components 426 & 427 are rotated and recombined back into ones with random polarization 430 & 432 using a half-wave plate 412 and a PBS 414. The selection of the center wavelength of the arbitrary specified wavelength or band of wavelengths is achieved by rotating the said optical filter module 409.

It is worth noting that in this tunable filter, both the arbitrary specified wavelength or a band of wavelengths (a drop signal 430) and the remaining wavelengths (output signal 432) are propagating in the same direction, but the spatial separation between the drop 430 and output 432 signals varies when the optical block 408 is rotated. This negatively limits tunable wavelength range. Although the tunable wavelength range of the filter could be wider if the coupling region of output ports 430 is moved up and down synchronously, but it would make this module expensive in manufacturing and difficult in operation.

The incorporation of an additional dummy clear optical block 408 before the output port (not shown in FIGS. 3 and 4 of the present application, but is shown as element 110 in FIG. 5 of the U.S. Pat. No. 6,714,743), which is rotated to an angle equal but in opposite direction to the filter module 409 ensures that the drop signal maintains the same location as the filter module 409 rotates.

Another additional element introduced in FIG. 5 of the U.S. Pat. No. 6,714,743 is a corner cube returning the output signal back in a direction opposite to the input signal with a certain limited spatial separation between the input and output signals, which is limited by the size of the corner cube and other factors, and therefore has a drawback of limited inter-channel isolation performance similar to that of FIG. 4 described above in the present application.

In addition, the design of the tunable filter of FIG. 5 of the U.S. Pat. No. 6,714,743 has another drawback. It requires that the filter module and the corner cube are separately rotatable pieces, because they need to be rotated by different angles, namely the rotation of the corner cube has to be twice the angular rotation of the filter block, see column 7 lines 9-14 of the U.S. Pat. No. 6,714,743. This makes this tunable optical filter expensive in manufacturing and difficult in operation.

Therefore, there is a need in the industry for developing an improved tunable optical filter, which would be mechanically simple and reliable, while providing a non-constrained spatial separation of input, output and drop signals.

SUMMARY OF THE INVENTION

Therefore, there is an object of the present invention to provide a tunable optical filter and a corresponding method that would avoid or mitigate the above-mentioned drawbacks.

According to one aspect of the invention, there is provided a tunable optical filter, comprising:

(a) a separator for spatially separating an input optical signal and an output optical signal traveling in opposite directions but sharing a same optical path;

(b) an optical means for spectrally splitting the input optical signal comprising a plurality of wavelengths into a drop optical signal comprising one or more wavelengths of said plurality of wavelengths, and an output optical signal comprising remaining wavelengths of said plurality of wavelengths;

(c) an optical means for directing the output optical signal back to the separator along the said same optical path; and (d) a means for tuning the tunable optical filter to select said one or more wavelengths.

Preferably, the optical means (a) comprises one of the following:
an optical circulator; or
an optical cube beam-splitter.

In the tunable optical filters described above, the optical means (b) comprises an optical thin-film filter (TFF), and the optical means (c) comprises a rotatable mirror and a spatially fixed mirror, of which the optical TFF and the rotatable mirror are free to rotate, and the spatially fixed mirror is spatially fixed.

Advantageously, the means (d) comprises a means for rotating the optical TFF and the rotatable mirror synchronously by the same angle.

In the embodiments of the present invention, the means for rotating comprises a single platform accommodating the TFF and the rotatable mirror, which is controlled by a stepper motor.

In one embodiment of the invention, the tunable optical filter further comprises a first polarization beam-splitter (PBS) and a half-wave plate disposed before the optical means (b), and a second polarization beam-splitter (PBS) and a half-wave plate disposed after the optical means (b).

Conveniently, the tunable optical filter further comprises a first fiber collimator, which is disposed before the first PBS, and a second fiber collimator, which is disposed after the second PBS.

In another embodiment of the invention, the tunable optical filter is designed without the first and second polarization beam-splitters, but includes first and second fiber collimators to yet further simplify the design of the tunable optical filter.

To provide an automatic selection of the drop optical signal, the means (d) comprises a digital signal processor (DSP) unit, and an optical tap and detector monitoring the drop optical signal.

According to another aspect of the present invention, there is provided a tunable optical filter, comprising:
a separator for spatially separating an input optical signal and an output optical signal;
a pass-band filter for spectrally splitting the input optical signal comprising a plurality of wavelengths into a drop optical signal comprising one or more wavelengths of said plurality of wavelengths, and an output optical signal comprising remaining wavelengths of said plurality of wavelengths;
a rotatable mirror reflecting the output optical signal onto a spatially fixed mirror; an optical path between the separator and the spatially fixed mirror forming a input/output optical path;
the spatially fixed mirror is positioned to reflect the output optical signal along the input/output optical path back to the separator.

Beneficially, the separator comprises one of the following:
an optical circulator; or
an optical cube beam-splitter.

Preferably, the pass-band filter comprises an optical thin-film filter.

The tunable optical filter further comprises a means for rotating the pass-band filter and the rotatable mirror synchronously by the same angle, e.g., by using a stepper motor.

In one embodiment of the invention, the tunable optical filter further comprises a first polarization beam-splitter (PBS) and a half-wave plate disposed before the pass-band filter, and a second polarization beam-splitter (PBS) and a half-wave plate disposed after the pass-band filter.

Conveniently, the tunable optical filter further comprises a first fiber collimator, which is disposed at the input before the first PBS, and a second fiber collimator, which is disposed at the output after the second PBS.

In another embodiment of the invention, the tunable optical filter is designed without the first and second polarization beam-splitters, but includes first and second fiber collimators to yet further simplify the design of the tunable optical filter.

Advantageously, the tunable optical filter further comprises a digital signal processor (DSP) unit, and an optical tap and detector monitoring the drop optical signal.

According to yet another aspect of the present invention there is provided a method for spectrally splitting and spatially separating an input optical signal into an output optical signal and a drop optical signal, comprising steps of:

(a) spatially separating an input optical signal and an output optical signal;

(b) spectrally splitting the input optical signal comprising a plurality of wavelengths into a drop optical signal comprising one or more wavelengths of said plurality of wavelengths, and an output optical signal comprising remaining wavelengths of said plurality of wavelengths;

(c) reflecting the output optical signal by a rotatable mirror onto a spatially fixed mirror; an optical path between the separator and the spatially fixed mirror being an input/output optical path; and (d) reflecting the output optical signal by the spatially fixed mirror so that the output optical signal travels along the input/output optical path back to the separator.

In the embodiment of the present invention, the method further comprises a step of rotating the pass-band filter and the rotatable mirror synchronously by the same angle.

Conveniently, the method described above further comprises steps of:
separating the input optical signal into "s" and "p" polarized components with a polarization beam-splitter (PBS);
rotating one of the "s" and "p" polarized components with a half-wave plate before the step (b);
rotating the other polarized component with another half-wave plate after the step (b); and
combining the "s" and "p" polarized components into the drop optical signal.

Conveniently, the method may comprise steps of:
passing the input optical signal through a first fiber collimator before the step (b); and
passing the drop optical signal through a second fiber collimator after the step (b).

Thus, an improved tunable optical filter of the embodiments of the present invention has been provided, which has a mechanically simple design in which the physical separation of the output ports is not constrained. A corresponding method for spectrally splitting and spatially separating an input optical signal into an output optical signal and a drop optical signal is also provided.

BRIEF DESCRIPTION OF THE DRAWINGS

Related art and embodiments of the present invention will now be described, by way of example, with reference to the accompanying drawings in which:

FIGS. 2a and 2b illustrate a prior art tunable three-port optical filter, which allows adding or dropping a single variable wavelength or a band of wavelengths that are dynamically selected by rotation of an L-shaped filter module;

DETAILED DESCRIPTION OF THE PREFERRED EMBODIMENTS

Figure 1:
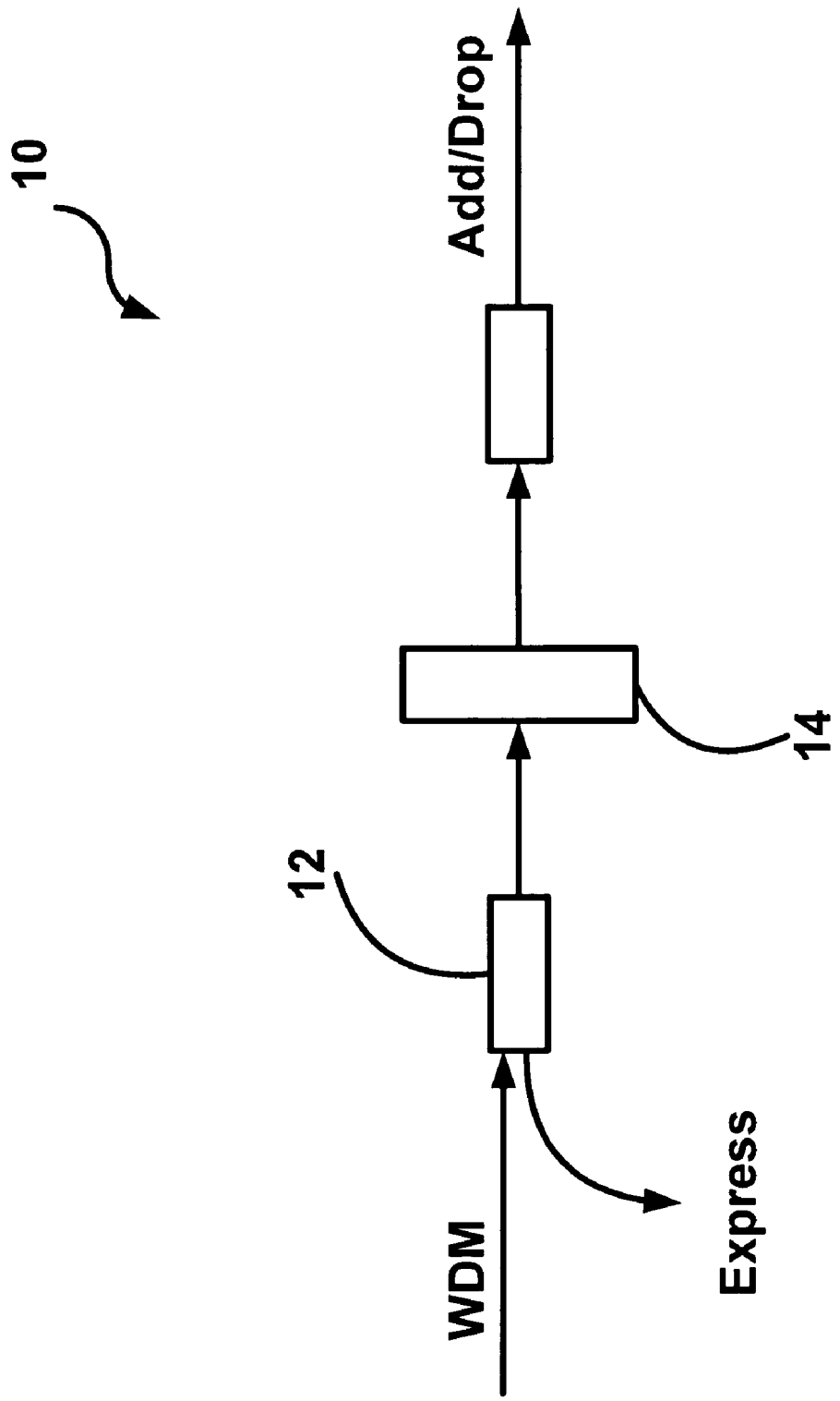
FIG. 1 illustrates a prior art three-port optical filter, which allows adding or dropping of a single pre-determined wavelength or a band of pre-determined wavelengths.
Figure 3:
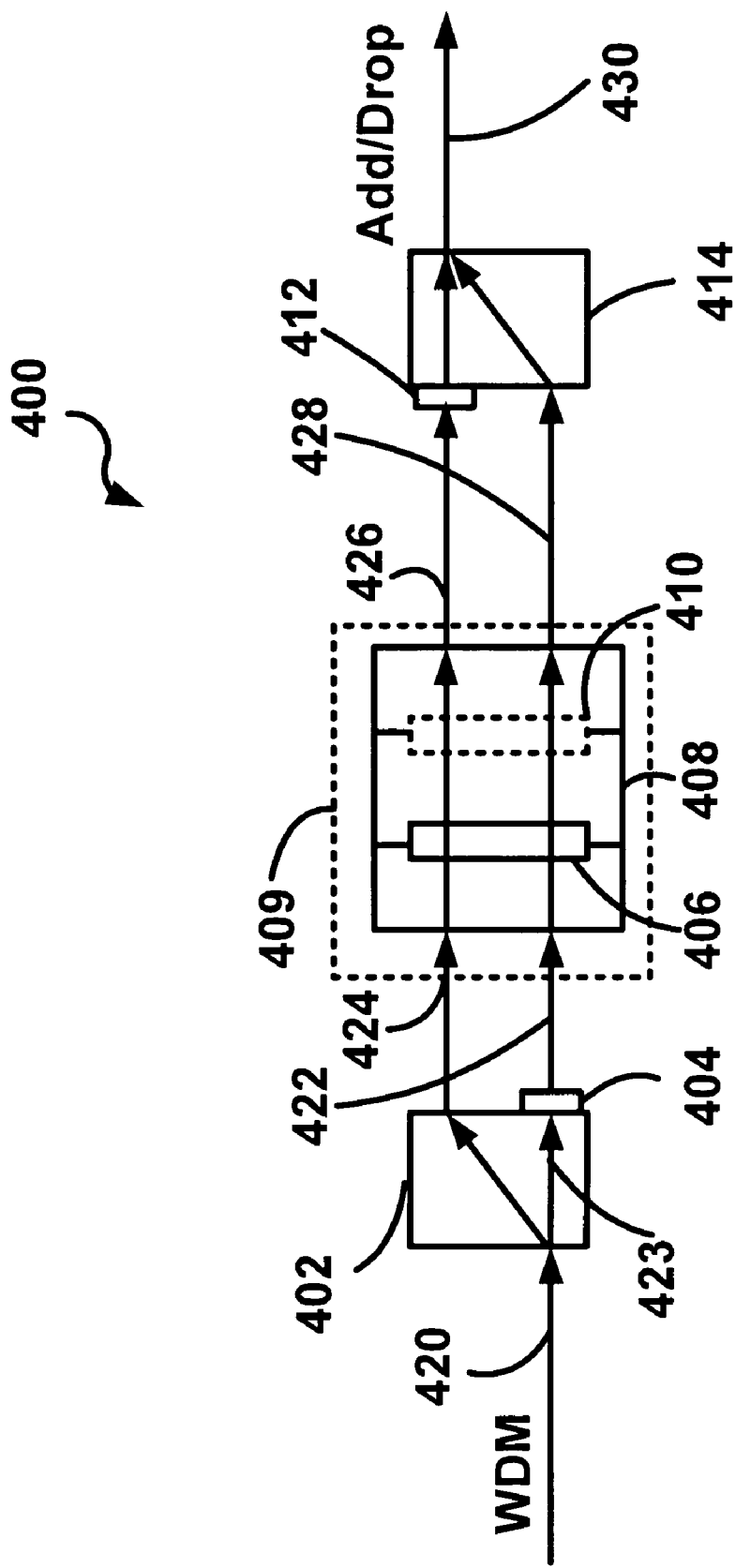
FIGS. 3 and 4 illustrate side and top views of the prior art tunable three-port optical filter, which allows adding or dropping a single variable wavelength or a band of wavelengths that are dynamically selected by rotation of a clear optical block to which a thin film filter and a mirror are attached.
Figure 4:
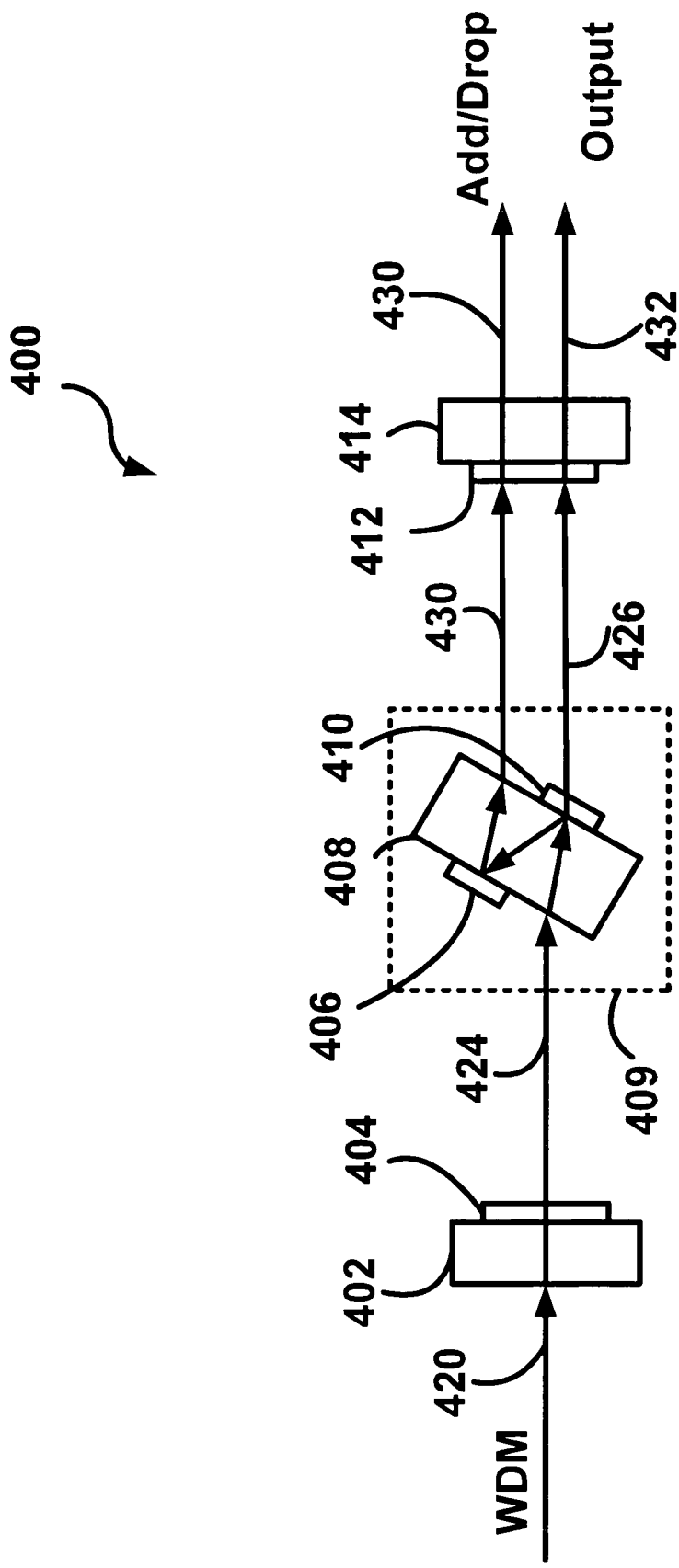
Figure 5:
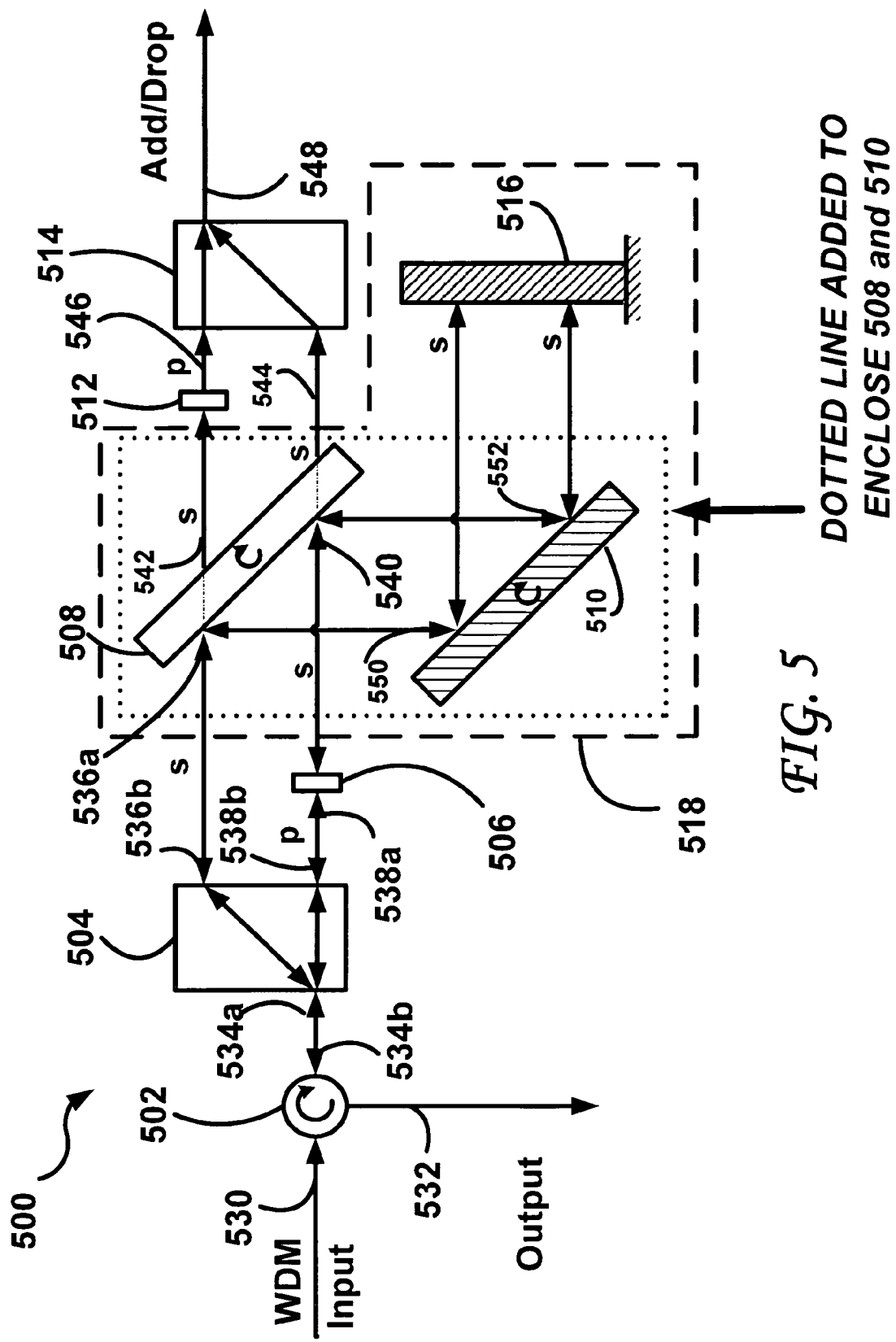
FIG. 5 illustrates a tunable optical filter according to a first embodiment of the present invention.

A tunable optical filter 500 for adding or dropping a wavelength or a band of wavelengths according to the first embodiment of the present invention is illustrated in FIG. 5. The tunable optical filter 500 comprises an optical circulator 502, first and second polarization beam splitters (PBS) 504 and 514 respectively, a freely rotatable optical thin-film filter (TFF) 508, which is a pass-band filter, a freely rotatable mirror 510, a spatially fixed mirror 516, and two half-wave plates 506 and 512.

The separator 502 provides a spatial separation of an input optical signal 530 and an output optical signal 534b traveling in opposite directions; a pass-band filter provides a spectral splitting the input optical signal 530 comprising a plurality of wavelengths into a drop optical signal 548 comprising one or more wavelengths of said plurality of wavelengths, and an output optical signal comprising remaining wavelengths of said plurality of wavelengths; a rotatable mirror 510 reflects the output optical signal onto a spatially fixed mirror 516; an optical path between the separator 502 and the spatially fixed mirror 516 forming a input/output optical path; the spatially fixed mirror 516 is positioned to reflect the output optical signal 534b along the input/output optical path back to the separator 502.

The operation of the tunable optical filter 500 is described in more detail below. The input wavelength division multiplexed (WDM) optical signal 530 with random polarization, comprising of a plurality of wavelengths, first passes through the optical circulator 502 and then through the first PBS 504 where it is split into a s-polarized component 536a and a p-polarized component 538a respectively. The p-polarized component 538a is subsequently rotated by a half-wave plate 506 into one of s-polarization 540.

The two s-polarized components 536a and 540 then pass through an optical filter module 518. The optical filter module 518 comprises a freely rotatable optical TFF 508, a freely rotatable mirror 510, and a spatially fixed mirror 516. The s-polarized components 536a and 540 are processed by the optical TFF 508, so that drop s-polarized components 542 and 544 having an arbitrary specified wavelength or a band of wavelengths are transmitted through the optical TFF and propagate towards the half-wave plate 512 and the second PBS 514 for further processing, and the output s-polarized components 550 and 552 with the plurality of remaining wavelengths reflect off the optical TFF 508 to the mirrors 510 & 516, and back along their propagation paths. The s-polarized drop components 542 with the arbitrary specified wavelength or a band of wavelengths is rotated into a p-polarized component 546. The s-polarized drop component 544 and a p-polarized drop component 546 are then combined into a randomly polarized drop optical signal 548 by the second PBS 514. The s-polarized output component 552 with the plurality of remaining wavelengths is rotated by the half wave-plate 506 into a p-polarized output component 538b. The output s-polarized component 536b and output p-polarized component 538b are then combined into a randomly polarized output optical signal 534b by the first PBS 504.

The tuning of the tunable optical filter 500 to select the center wavelength of the arbitrary specified wavelength or a band of wavelengths is performed by rotating the said optical TFF 508 and the rotatable mirror 510 synchronously by the same angle by mechanical means. Preferably, the optical TFF 508 and the mirror 510 are mechanically coupled to ensure that both the optical TFF 508 and the rotatable mirror 510 rotate about their respective central axes by the same angle.

In a modification to the first embodiment of the invention, the half-wave plates 506 and 512 are located in the paths of the s-polarized components 536a and 544 (instead of being located in the path of the p-polarized components 538a and 542), which are then rotated into respective p-polarized components. In such alternative arrangement, the polarization state descriptions subsequently would have s- and p-polarization reversed.

In another modification to the first embodiment of the invention, the optical circulator 502 is replaced with an optical cube beam-splitter (CBS).

In yet another modification to the first embodiment of the invention, the optical TFF 508 comprises a plurality of dielectric layers, also known as a multi-cavity TFF, thus allowing a substantially flat passband and high inter-channel isolation.

Conveniently, the tunable optical filter of the first embodiment further comprises a first fiber collimator (not shown in FIG. 5), which is disposed at the input before the first PBS 504, and a second fiber collimator (not shown in FIG. 5), which is disposed at the output after the second PBS 514.

In another embodiment of the invention, the tunable optical filter is designed without the first and second polarization beam-splitters 504 and 514, but includes first and second fiber collimators to yet further simplify the design of the tunable optical filter.

Simulation results are shown in FIGS. 6 to 10 to illustrate the improved polarization characteristics of the tunable optical filter of the embodiments of the present invention. The simulations are performed under assumptions of having ideal broad-spectrum optical sources with s-polarization, p-polarization, and randomly polarized signals, a glass input and output coupler, an optical TFF, an ideal power detector, and air as the free-space propagation medium.

Figure 6:
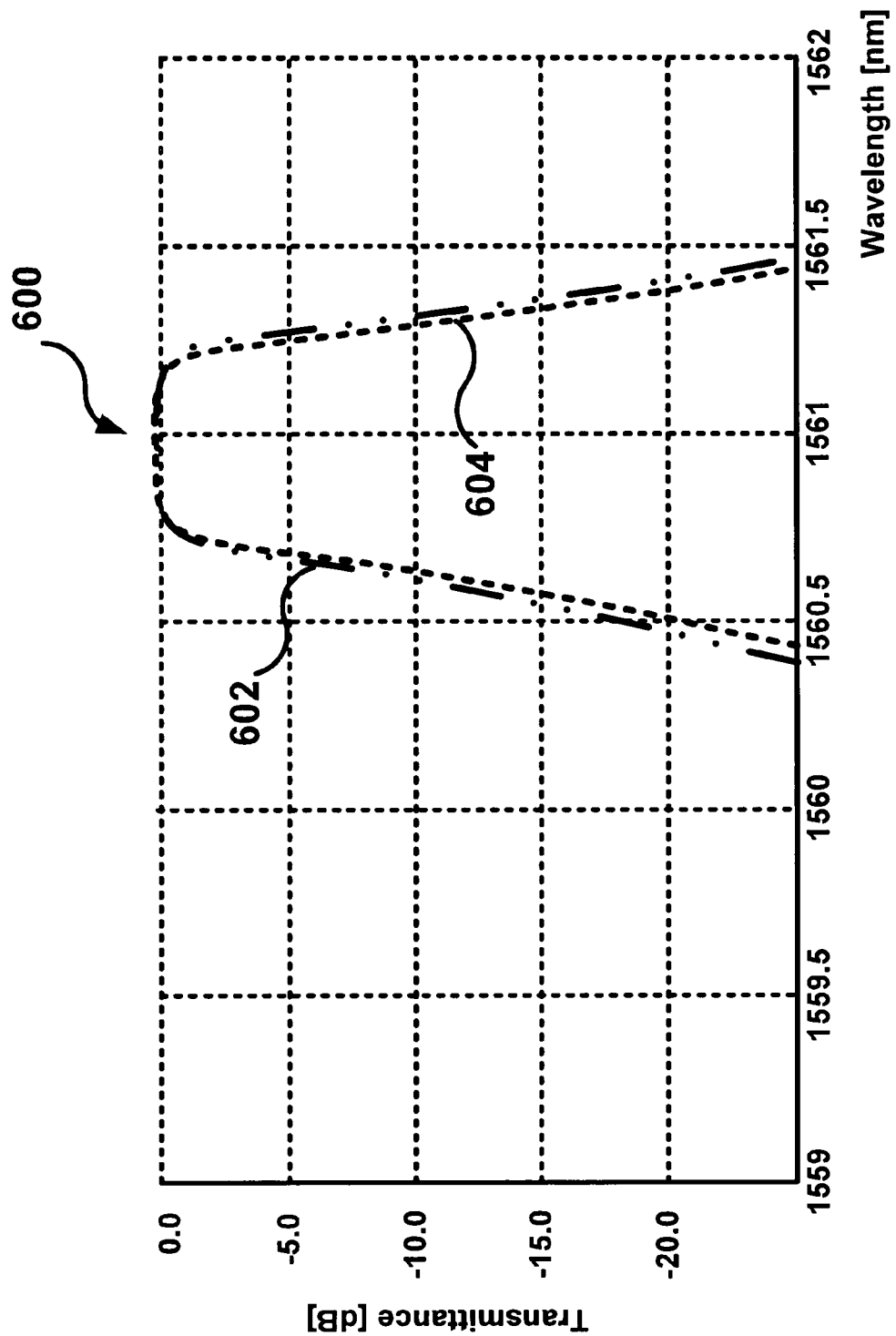
FIG. 6 shows a graph illustrating the transmission spectrum of s-polarized 604 and p-polarized light 602 passing through a thin-film filter 508 of FIG. 5 with an angle of incidence between the thin-film filter and the incident optical signal equal to 4.8 degrees.
Figure 7:
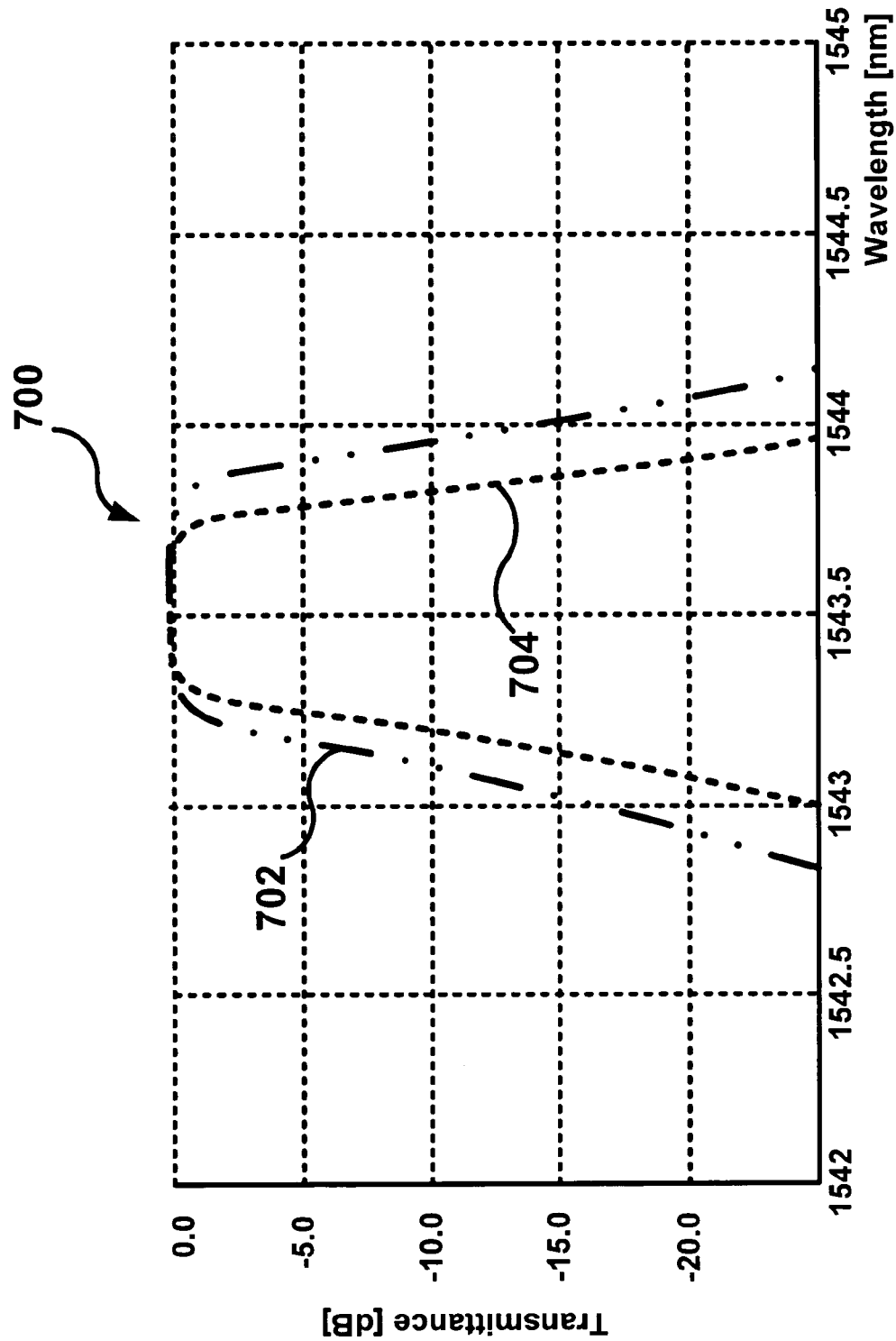
FIG. 7 shows a graph illustrating the simulated transmission spectrum of s-polarized 704 and p-polarized light 702 passing through the thin-film filter 508 of FIG. 5 with an angle of incidence between the thin-film filter and the incident optical signal equal to 15 degrees.
Figure 8:
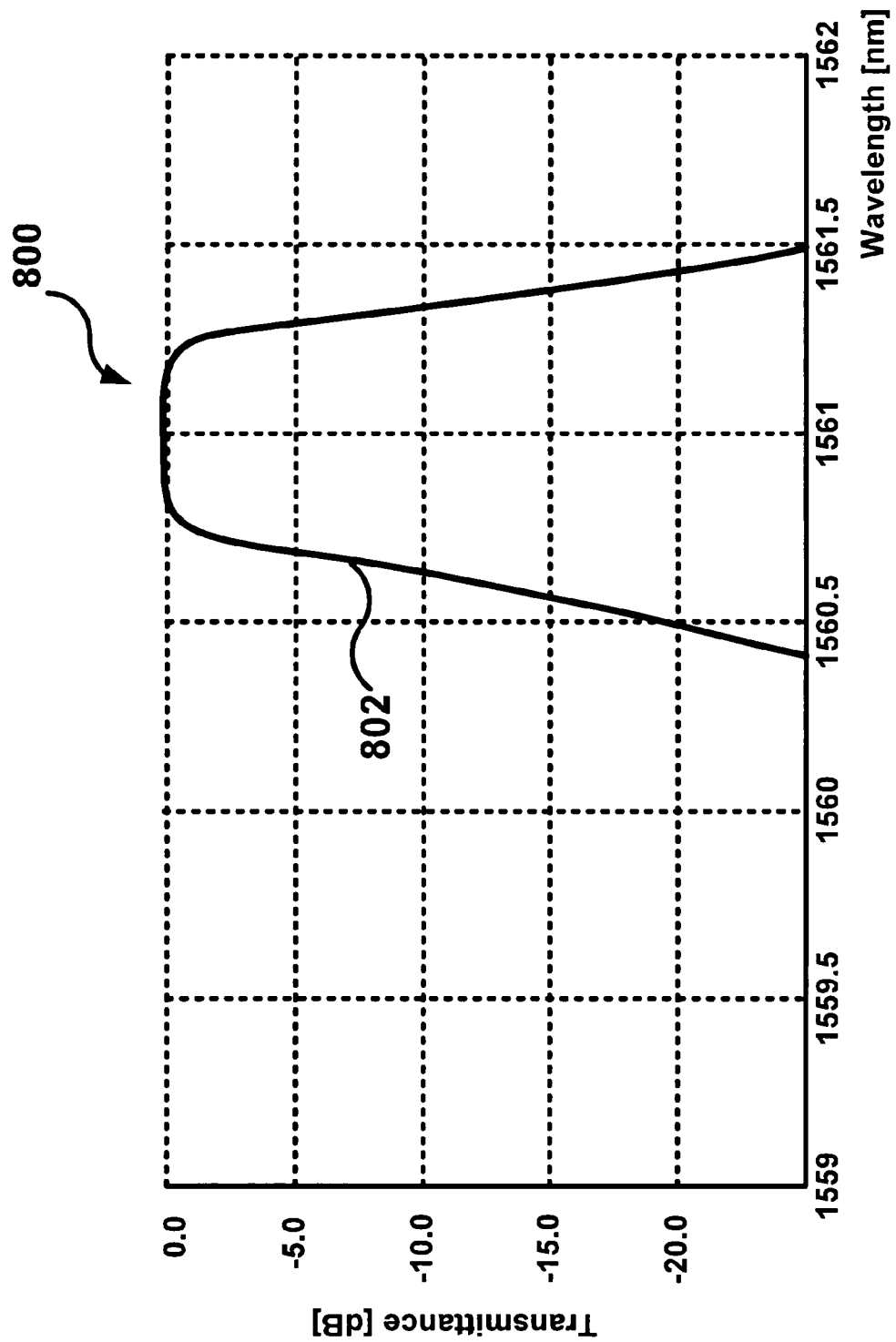
FIG. 8 shows a graph illustrating the simulated transmission spectrum of s-polarized light 802 passing through the thin-film filter 508 of FIG. 5 with an angle of incidence between the thin-film filter and the incident optical signal equal to 4.8 degrees.
Figure 9:
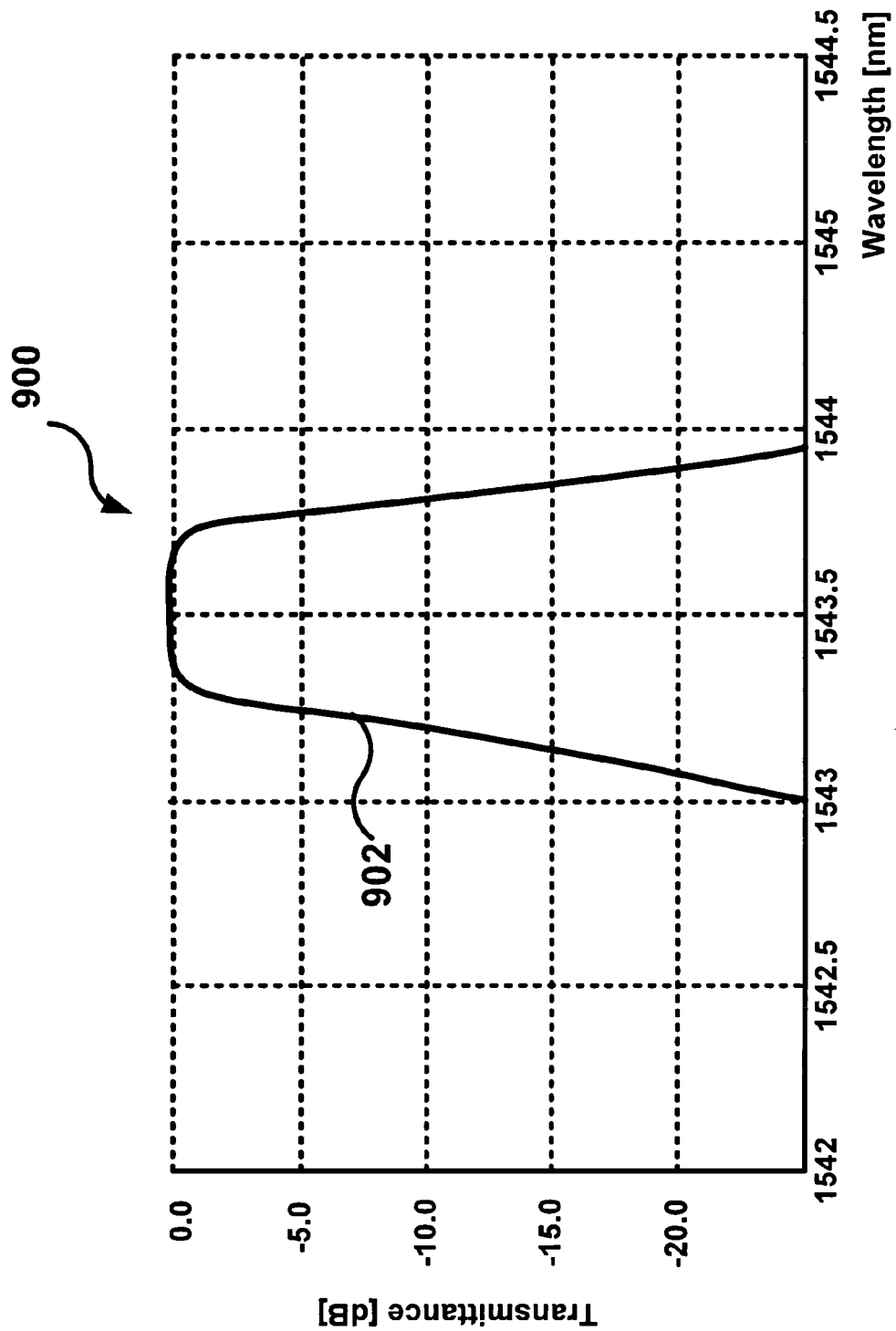
FIG. 9 shows a graph illustrating the simulated transmission spectrum of s-polarized light 902 passing through the thin-film filter 508 of FIG. 5 with an angle of incidence between the thin-film filter and the incident optical signal equal to 15 degrees.
Figure 10:
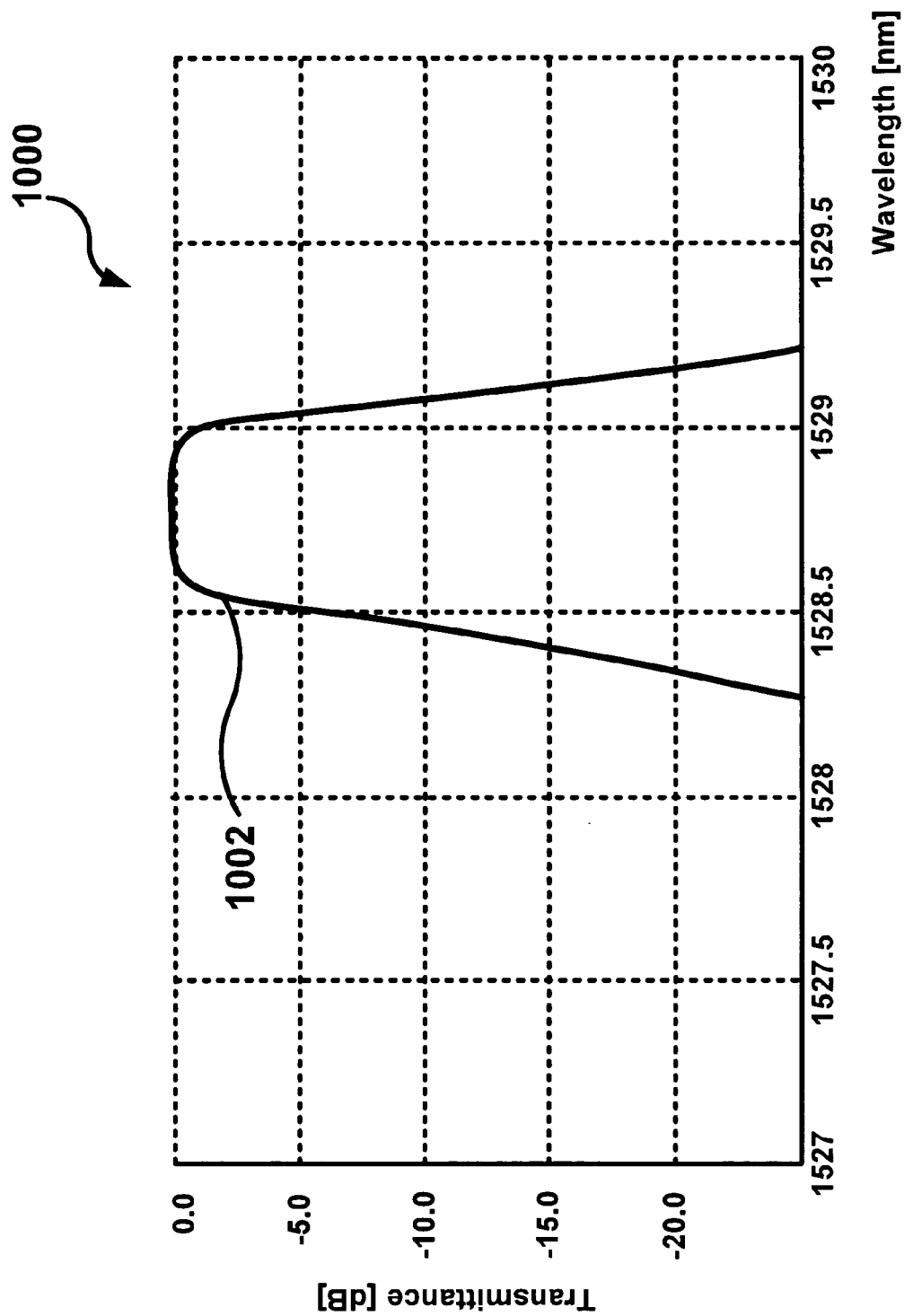
FIG. 10 shows a graph illustrating the simulated transmission spectrum of s-polarized light 1002 passing through the thin-film filter 508 of FIG. 5 with an angle of incidence between the thin-film filter and the incident optical signal equal to 20 degrees.

FIGS. 6 and 7 show graphs illustrating pairs of the simulated transmission spectra (602, 604) and (702, 704) of the optical TFF 508 for s-polarized and p-polarized light at incident optical angles of 4.8 degrees and 15 degrees respectively. In FIG. 6, the transmission spectra of the s-polarized 604 and p-polarized light 602 are substantially the same, indicating low polarization dependence of the optical TFF 508. In FIG. 7, because of a larger incident angle, the optical transmission spectra of the s-polarized 704 and p-polarized light 702 differ more than in FIG. 6. Thus, if the polarization effect is left uncontrolled, the range of rotation of the optical TFF 508 has to be limited, which ultimately limits the wavelength tunable range of the tunable optical filter 500. This problem has been resolved in the embodiments of the present invention through rotation of one polarization to the other polarization using the first and second PBS 504 and 514 and respective half-wave plates 506 and 512 so that only one polarization is transmitted through the optical TFF 508. Thus, the polarization dependence of the optical TFF 508 is substantially eliminated regardless of the angle of incidence, as illustrated in FIG. 8, which shows a graph illustrating the simulated transmission spectrum of the optical TFF 508 for s-polarized light at an incident optical angle of 4.8 degrees. In this simulation, the setup is similar to the simulation conditions which have led to the results in FIGS. 6 and 7, except a pair of the first and second PBS 504 and 514 and half-wave plates 506 and 512 similar to the ones described in the first embodiment of the invention are included in the simulation setup in the same manner as illustrated in FIG. 5. The simulation produces a single transmission spectrum of s-polarized light 802 since both s- and p-polarized light are rotated into s-polarization before traveling through the optical TFF 508. FIGS. 9 and 10 show simulation results repeated under identical conditions, except for the incident optical angle being set to 15.0 and 20.0 degrees in FIGS. 9 and 10 respectively, producing corresponding transmission spectra 902 and 1002.

Figure 11:
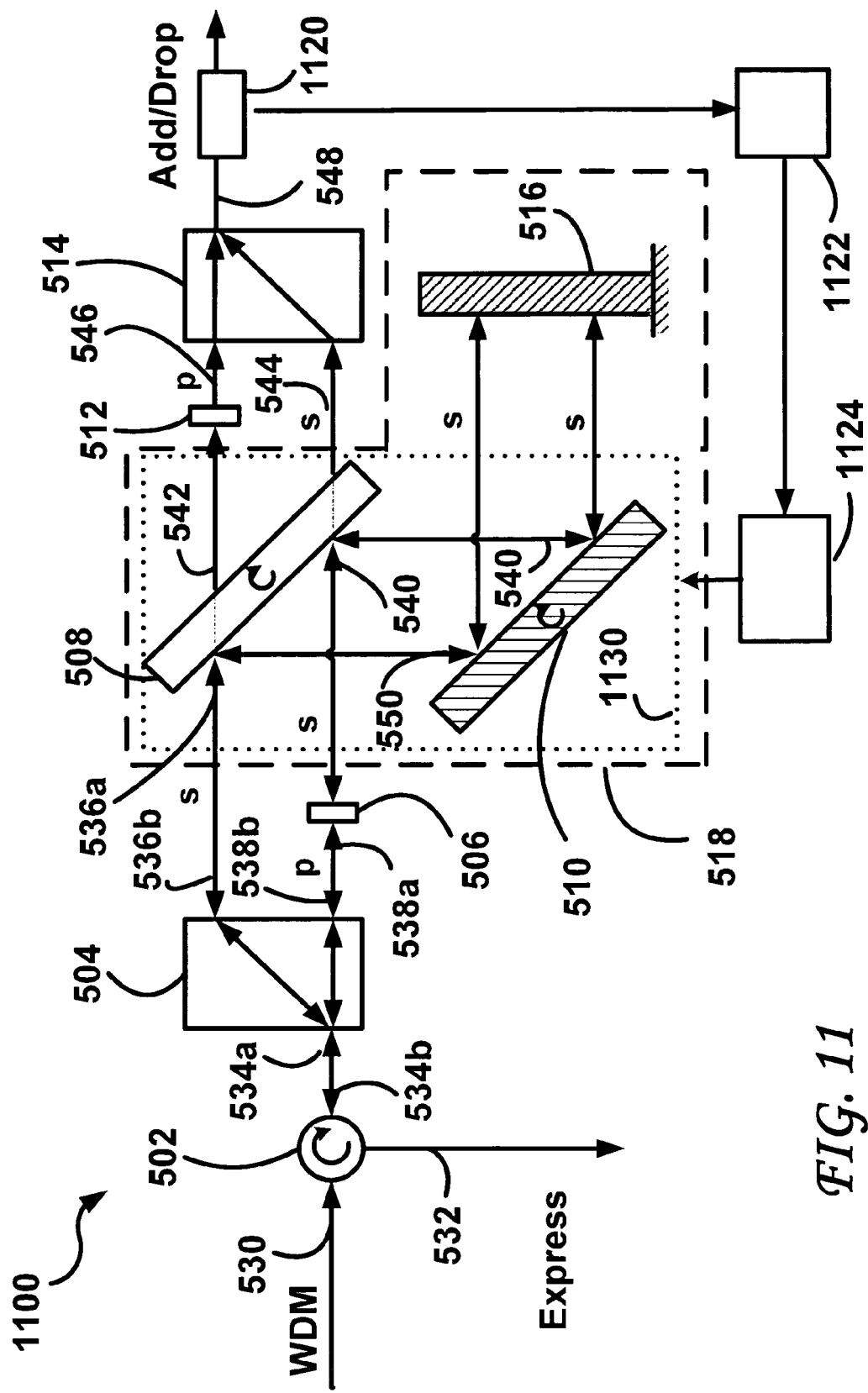
FIG. 11 illustrates a tunable optical filter according to a second embodiment of the present invention.

FIG. 11 illustrates a tunable optical filter according to a second embodiment of the invention, which is similar to that of the first embodiment shown in FIG. 5 except for an optical tap and a wavelength detector (TAP/WD) 1120, a digital signal processing (DSP) unit 1122, and a stepper motor 1124 being added as additional components for automating the tuning (mechanical adjustments) of the optical TFF 508 and the rotatable mirror 510.

Conveniently, the optical TFF 508 and the rotatable mirror 510 are accommodated on a single platform 1130, which is controlled by a stepper motor 1124.

In particular, the angle of rotation of the optical TFF 508 and the rotatable mirror 510 is determined by periodically monitoring optical characteristics of the drop optical signal 548 comprising the arbitrary specified wavelength or a band of wavelengths. The optical tap and wavelength detector 1120 provides a measurement of the center wavelength of the drop signal 548. The DSP unit 1122 uses this measurement to determine the required angle of rotation of the optical TFF 508 and the rotatable mirror 510, and stepper motor 1124 performs the rotation.

In one more modification to the embodiments of the present invention, the optical tap and wavelength detector 1120 is replaced by an optical tap and power detector for cost savings.

In yet another modification to the embodiment of the invention, the optical TFF 508 and the rotatable mirror 510 are not mechanically coupled. The rotations of the optical TFF 508 and the rotatable mirror 510 about their respective central axes are actuated by more than one stepper motor 1124, but are of substantially the same angle.

Conveniently, the tunable optical filter 1100 of the first embodiment further comprises a first fiber collimator (not shown in FIG. 5), which is disposed at the input before the first PBS 504, and a second fiber collimator (not shown in FIG. 5), which is disposed at the output after the second PBS 514.

Figure 12:
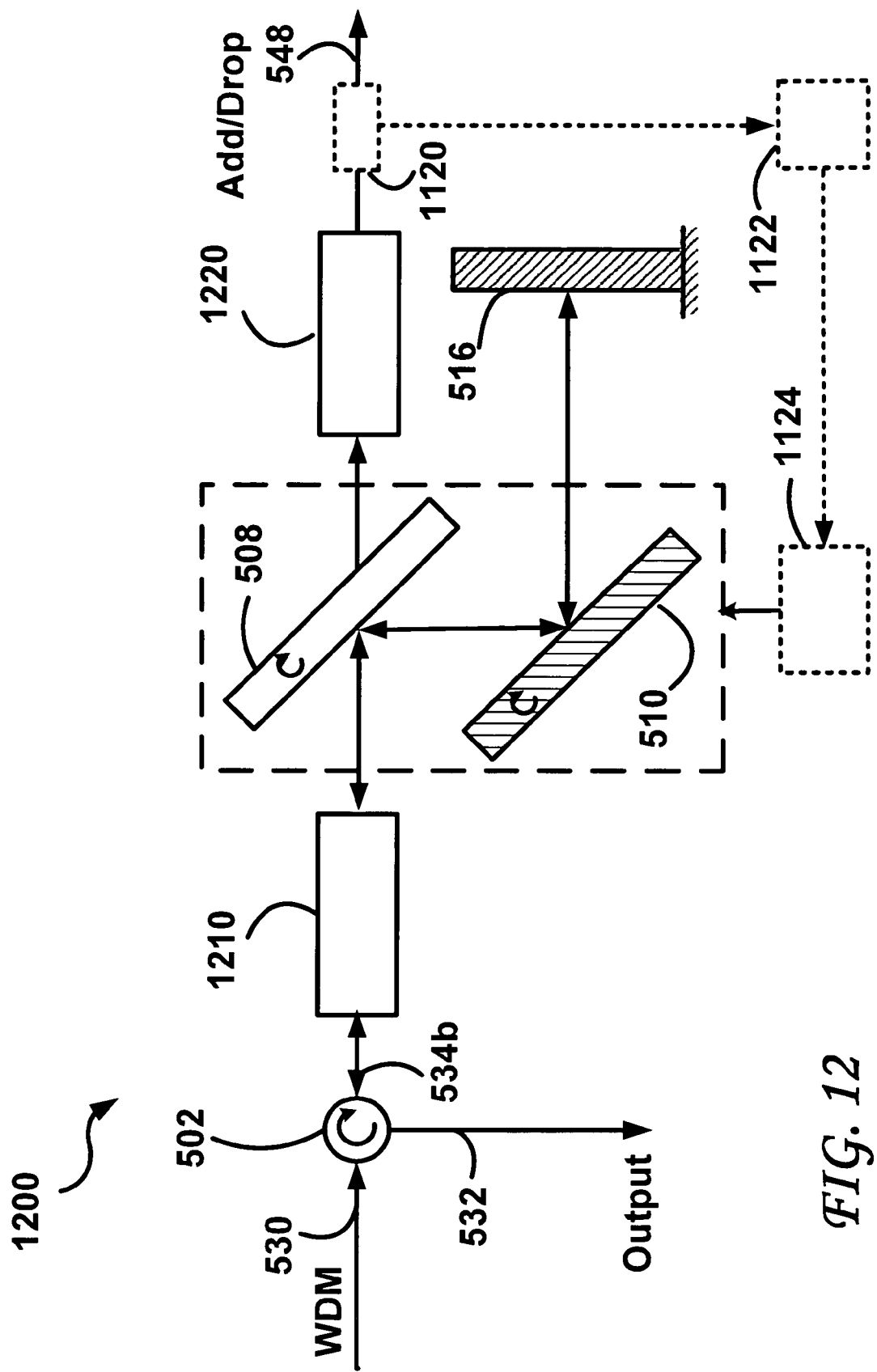
FIG. 12 illustrates a tunable optical filter according to a third embodiment of the present invention.

FIG. 12 illustrates a tunable optical filter according to a third embodiment of the present invention. It is similar to the first and second embodiments of FIGS. 5 and 11, except for the first and second polarization beam-splitters 504 and 514 being removed in order to further simplify the design of the tunable optical filter. Conveniently, first and second fiber optical collimators 1210 and 1220, which are single fiber collimators, providing a fiber optical path for the input optical signal before the TFF 508, and for the drop optical signal after the TFF 508, are provided. The tunable filter 1200 of the third embodiment of the invention does not compensate for the polarization dependent losses, but has a simple and reliable mechanical design similar to that of the previous embodiments.

The embodiments of the present the invention provide the following advantages. The input, output and drop optical signals are substantially spatially separated, thus the limitation on spatial separation of the input, output and drop optical signals of the prior art has been overcome. In the embodiment of the invention, the output optical signal 534b is redirected back along the path of the input optical signal 534a and further re-directed at about 90 degrees in the circulator 502, while the drop optical signal 548 continues traveling in the direction of the input output signal with or without a spatial shift in various embodiments of the invention, thus providing a substantial spatial separation between the optical signals.

The tunable optical filter of the embodiments of the invention is also substantially mechanically simpler compared to the prior art. It includes simpler optical components that require much simpler mechanical control and therefore provide higher accuracy and reliability of the tunable optical filter.

It is apparent to those skilled in the art that there are many variations of the present invention that retain the spirit of the invention. Thus, it is intended that the present invention cover the modifications, variations, and adaptations of this invention provided they fall within the scope of the following claims.

What is claimed is:

1. A tunable optical filter, comprising:
   (a) a separator for spatially separating an input optical signal and an output optical signal traveling in opposite directions but sharing a same optical path;

(b) an optical means for spectrally splitting the input optical signal comprising a plurality of wavelengths into a drop optical signal comprising one or more wavelengths of said plurality of wavelengths, and the output optical signal comprising remaining wavelengths of said plurality of wavelengths;

(c) an optical means for directing the output optical signal back to the separator along the said same optical path; and (d) a means for tuning the tunable optical filter to select said one or more wavelengths;

wherein:
(i) the optical means for spectrally splitting comprises an optical thin-film filter (TFF),
(ii) the optical means for directing comprises a rotatable mirror and a spatially fixed mirror;
(ii) the optical TFF and the rotatable mirror are spaced apart and are free to rotate;
(iv) the rotatable mirror is arranged to be parallel to the optical TFF; and
(v) the means for tuning comprises a means for rotating the optical TFF and the rotatable mirror synchronously by the same angle.

2. The tunable optical filter as described in claim 1, wherein the separator comprises one of the following:
an optical circulator; or
an optical cube beam-splitter.

3. The tunable optical filter as described in claim 1, wherein the means for rotating comprises a single platform accommodating the optical TFF and the rotatable mirror, the single platform is controlled by a stepper motor.

4. The tunable optical filter as described in claim 1, further comprising a first polarization beam-splitter (PBS) and a first half-wave plate before the optical means for spectrally splitting, and a second polarization beam-splitter (PBS) and a second half-wave plate after the optical means for spectrally splitting.

5. The tunable optical filter as described in claim 1, further comprising a first fiber collimator before the optical means for spectrally splitting, and a second fiber collimator after the optical means for spectrally splitting.

6. The tunable optical filter as described in claim 1, wherein the means for tuning comprises a digital signal processor (DSP) unit, and an optical tap and detector monitoring the drop optical signal.

7. The tunable optical filer as described in claim 1, wherein the optical TFF and the rotatable mirror are free to rotate independently around their respective axes of rotation, and the means for rotating comprises means for rotating the optical TFF and the rotatable mirror independently.

8. A tunable optical filter, comprising:
a separator for spatially separating an input optical signal and an output optical signal;
a pass-band filter for spectrally splitting the input optical signal comprising a plurality of wavelengths into a drop optical signal comprising one or more wavelengths of said plurality of wavelengths, and an output optical signal comprising remaining wavelengths of said plurality of wavelengths;
a rotatable mirror reflecting the output optical signal onto a spatially fixed mirror; an optical path between the separator and the spatially fixed mirror forming a input/output optical path;
the spatially fixed mirror is positioned to reflect the output optical signal along the input/output optical path back to the separator;

the rotatable mirror is arranged to be parallel to the pass-band filter and spaced apart from the pass-band filter;
a means for rotating the pass-band filter and the rotatable mirror synchronously by the same angle.

9. The tunable optical filter as described in claim 8, wherein the separator comprises one of the following:
an optical circulator; or
an optical cube beam-splitter.

10. The tunable optical filter as described in claim 8, wherein the pass-band filter comprises an optical thin-film filter.

11. The tunable optical filter as described in claim 8, wherein the means for rotating comprises a stepper motor.

12. The tunable optical filter as described in claim 8, further comprising a first polarization beam-splitter (PBS) and a half-wave plate before the pass-band filter, and a second polarization beam-splitter (PBS) and a half-wave plate after the pass-band filter.

13. The tunable optical filter as described in claim 8, further comprising a first fiber collimator before the pass-band filter, and a second fiber collimator after the pass-band filter.

14. The tunable optical filter as described in claim 8, further comprising a digital signal processor (DSP) unit, and an optical tap and detector monitoring the drop optical signal.

15. The tunable optical filer as described in claim 8, wherein the pass-band filter and the rotatable mirror are free to rotate independently around their respective axes of rotation, and the means for rotating comprises means for rotating the pass-band filter and the rotatable mirror independently.

16. A method for spectrally splitting and spatially separating an input optical signal into an output optical signal and a drop optical signal, comprising:
(a) spatially separating the input optical signal and the output optical signal;
(b) in a pass-band filter, spectrally splitting the input optical signal comprising a plurality of wavelengths into the drop optical signal comprising one or more wavelengths of said plurality of wavelengths, and the output optical signal comprising remaining wavelengths of said plurality of wavelengths;
(c) arranging a rotatable mirror to be parallel to the pass-band filter and spacing apart from the pass-band filter, and reflecting the output optical signal by the rotatable mirror onto a spatially fixed mirror; an optical path between the separator and the spatially fixed mirror being an input/output optical path;
(d) reflecting the output optical signal by the spatially fixed mirror so that the output optical signal travels along the input/output optical path back to the separator; and
(e) rotating the pass-band filter and the rotatable mirror synchronously by the same angle.

17. The method as described in claim 16, further comprising steps of:
(i) separating the input optical signal into "s" and "p" polarized components with a polarization beam-splitter (PBS);
(ii) rotating one of the "s" and "p" polarized components with a half-wave plate before the step (b);
(iii) rotating the other polarized component with another half-wave plate after the step (b); and
(iv) combining the "s" and "p" polarized components rotated in the steps (ii) and (iii) into the drop optical signal.

18. The method as described in claim 16, further comprising steps of:
passing the input optical signal through a first fiber collimator before the step (b); and passing the drop optical signal through a second fiber collimator after the step (b).

19. The tunable optical filter as described in claim 7, wherein the means for rotating the optical TFF and the rotatable mirror independently comprises first and second stepper motors.

20. The tunable optical filter as described in claim 7, wherein the optical TFF and the rotatable mirror are symmetrical, and their respective axes of rotation coincide with their respective axes of symmetry.

* * * * *